Dec. 25, 1962  D. SOMMERS  3,070,694
DIFFRACTION CAMERAS
Filed Oct. 3, 1960  3 Sheets-Sheet 1

INVENTOR
DAVID SOMMERS
BY
ATTORNEY

Dec. 25, 1962 D. SOMMERS 3,070,694
DIFFRACTION CAMERAS
Filed Oct. 3, 1960 3 Sheets-Sheet 2
Fig. 2.
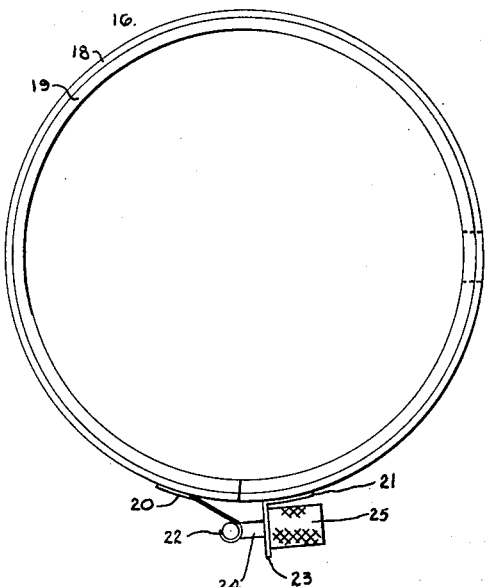
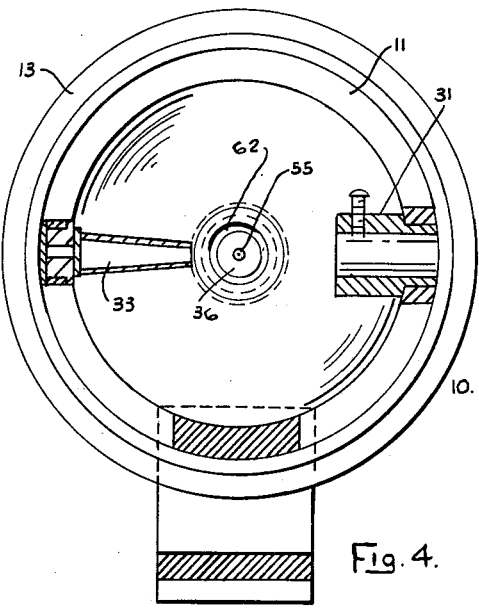
Fig. 4.
Fig. 5.
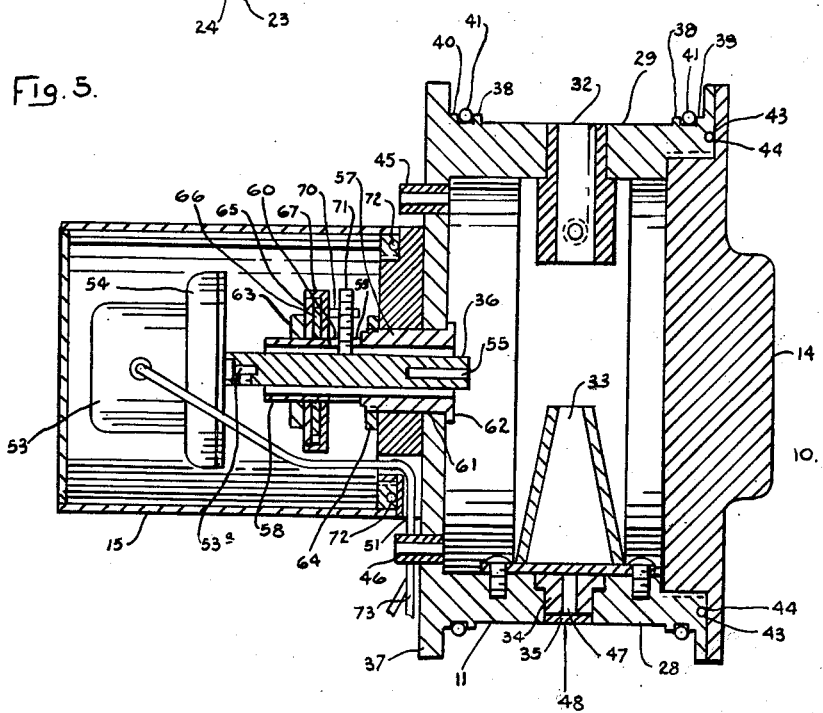
INVENTOR
DAVID SOMMERS
BY
ATTORNEY Dec. 25, 1962 D. SOMMERS 3,070,694
DIFFRACTION CAMERAS
Filed Oct. 3, 1960 3 Sheets-Sheet 3
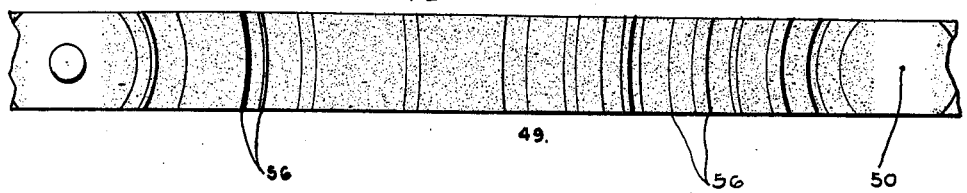
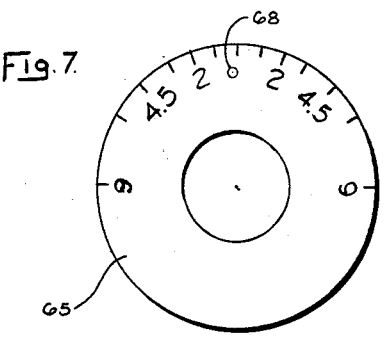
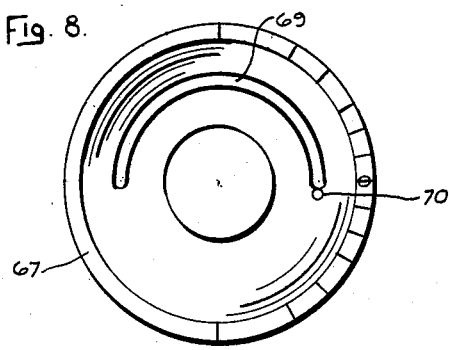
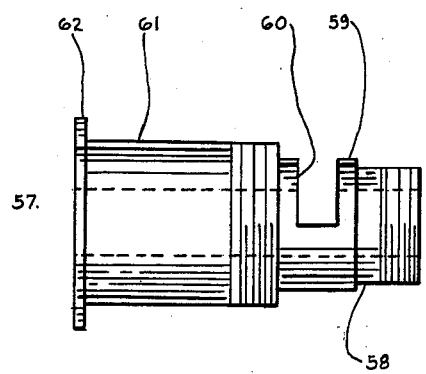
INVENTOR
DAVID SOMMERS
BY
ATTORNEY United States Patent Office 3,070,694
Patented Dec. 25, 1962

3,070,694
DIFFRACTION CAMERAS
David Sommers, 621 Adams Ave., Lindenhurst, N.Y.
Filed Oct. 3, 1960, Ser. No. 60,163
6 Claims. (Cl. 250—51.5)

This invention relates to diffraction cameras and means for photographically recording X-ray diffraction patterns of polycrystalline specimens or compositions after the manner developed and taught early in the twentieth century by Hull in the United States and Messrs. Scherrer and Debye in Germany.

The so-called Debye-Scherrer method of X-ray diffraction is based upon the application of Bragg's law whereby when the angle theta between the incident X-ray beam and a lattice array of atoms in a crystal satisfies the relation $$n\lambda = 2d_{hkl} \sin \theta$$

X-rays will be diffracted by the lattice array.

The patent to McLachlan, Jr., U.S. No. 2,341,108 is a good example of a typical X-ray diffraction camera of the type set up for standard powder (crystalline) analyses according to the Scherrer-Debye-Hull methods of X-ray diffraction. As there shown the conventional X-ray diffraction camera comprises a cylindrical housing along the axis of which a sample or crystalline powder specimen is mounted, preferably such that the axis of the sample is in parallel relation to the axis of the camera. A strip of sensitized film is placed around the outside periphery of the camera. The X-ray beam enters the camera interior from a hole in the wall of the cylindrical camera on one side thereof.

A collimator, whose function is to limit radiation of the X-ray to a narrow beam just wide enough to cover the sample or specimen, is placed on the diameter line of the camera. A beam stop is fixed on the opposite side of the camera wall to that from which the X-ray beam enters. The trap is separated from the collimator jutting out from the opposed wall of the cylinder, and interposed therebetween is the specimen.

After placing a suitable cover on the open face of the camera, the powder specimen ordinarily is slowly oscillated or rotated about its axis or center while X-rays are passed through the collimator, so that the diffraction pattern of that particular specimen that is actually mounted in the cylindrical camera is recorded then and there on the film. The film is later removed from the recorder and developed by conventional methods. Parts of the X-ray beam are diffracted at definite angles by the minute crystalls of the sample, and these produce characteristic X-ray diffraction lines or patterns on the film. That is to say, as the X-ray passes through the specimen it encounters many randomly disposed crystallites. Many of these are so oriented that a particular set of $hkl$ planes will make the correct theta angle for diffraction to occur in accordance with the formulation or equation set forth above. At each possible value of theta, determined by said equation, a diffracted beam, or reflection, is given off by the specimen. The several individual and distinct reflections form corresponding circular lines, ring segments or arcs on the narrow strip of film mounted on the outside wall of the camera.

Cylindrical X-ray cameras of the type just discussed, and with which the present invention is concerned are now used extensively in research laboratories and many industrial works for identifying and chemical analysis of many compositions, for the analysis of textures, and for many other purposes. In fact the cylindrical X-ray diffraction camera has become a first class analytical tool, playing an important role in the evolution and development of a number of modern concepts in crystal chemistry, solid state physics, mineral engineering and metallurgy, and in biological and physical research.

It is an object of the present invention to provide improvements in diffraction cameras of the character above described, and specifically an improved X-ray diffraction camera exemplifying and embodying the Hull-Scherrer-Debye principles of powder analysis of polycrystalline structures and configurations.

A further object is to produce an X-ray diffraction camera equipped with means for mounting, for aligning, and for removing the specimens in the light, that is, out of the dark room customarily used for photographic processes.

A still further object is an improved X-ray diffraction camera constructed and arranged to establish and maintain a controlled atmosphere, e.g., charged with certain advantageous gases, and light free.

Another feature of the present invention is a camera of the character discussed comprising means mounted on the diffraction camera for controlling both oscillation and rotation of the specimen or specimen carrying shaft, whereby the specimen may be rotated 360° either clockwise or counter clockwise, and oscillated from ±10° to ±90°.

Still another object is to provide sealed in operating units or governors controlling rotation and oscillation of the specimen mounts.

Still more purposes, objects and features of this invention are:

A camera assembly in which the sample may be mounted after the film is loaded into picture taking position.

The film is completely enclosed in a light tight compartment or housing.

Provision is made for interchanging specimen mountings of various kinds and descriptions, viz.: rods, capillary tubes, magnetic chucks.

A built in permanent marker in the beam stop or trap shows the zero point, that is, the point on the side of the camera opposite the collimator, to which the undiffracted X-rays penetrate beyond the specimen.

A beam trap or stop that readily can be removed from the diffraction camera assembly thereby permitting installation of a fluorescent transparent beam stop if desired.

An easy to remove, full diameter face plate is provided for closing off the interior camera assembly from view. With this face plate off, a full and open view of the camera interior is obtained, even while the camera is in operation and the X-ray on.

The whole camera assembly is lightweight, and its exterior surfaces are hard coated with a coating of aluminum oxide applied by electrolytic deposition to resist wear and tear.

Provision for bodily removing those portions of the camera assembly which control oscillation and rotation of the specimens, if desired.

Housing means for sealing off the film and specimen mountings, together with the rotation and oscillation governors thereby permitting a controlled atmosphere to be set up and maintained as long as necessary inside the workpiece or camera, even while the camera is in operation.

Means for not only introducing but also evacuating a controlled atmosphere, e.g. a gas, in the camera interior.

Only the film need be loaded in the dark or darkroom.

Both the beam trap and the collimator are easily removed and replaced; and different sizes of each may be installed in the camera.

Standard 1⅞" x 16" long medical X-ray film is used.

The full size side plate gives easy access to the camera, and when in place gives protection from and against X-ray "scatter."

With the above and other objects in view, as will be apparent, this invention consists in the construction, combination and arrangement of parts all as hereinafter more fully described, claimed and illustrated in the accompanying drawings wherein:

FIG. 2 is an end view of the outer apron or band which covers the photographic film in the loaded camera, with locking means for insuring a tight seal of the side edges of the band with the sides of the diffraction camera;

FIG. 4 is a cross section through the camera and its mounting only, taken on the line 4—4 of FIG. 3;

Figure 1:
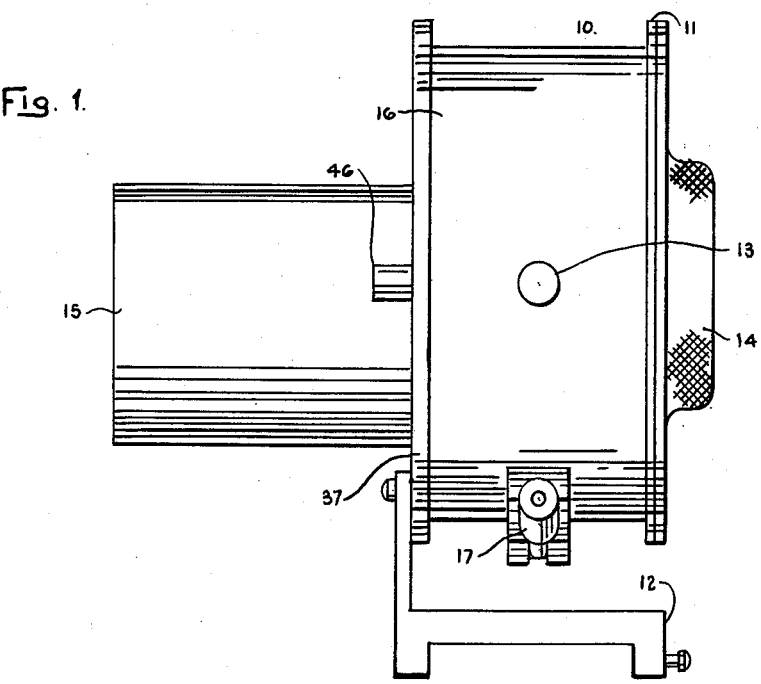
FIG. 1 is a side view of an improved X-ray powder diffraction camera comprising one embodiment or example of the present invention and illustrating the general exterior assembly and camera mounting bracket.
Figure 3:
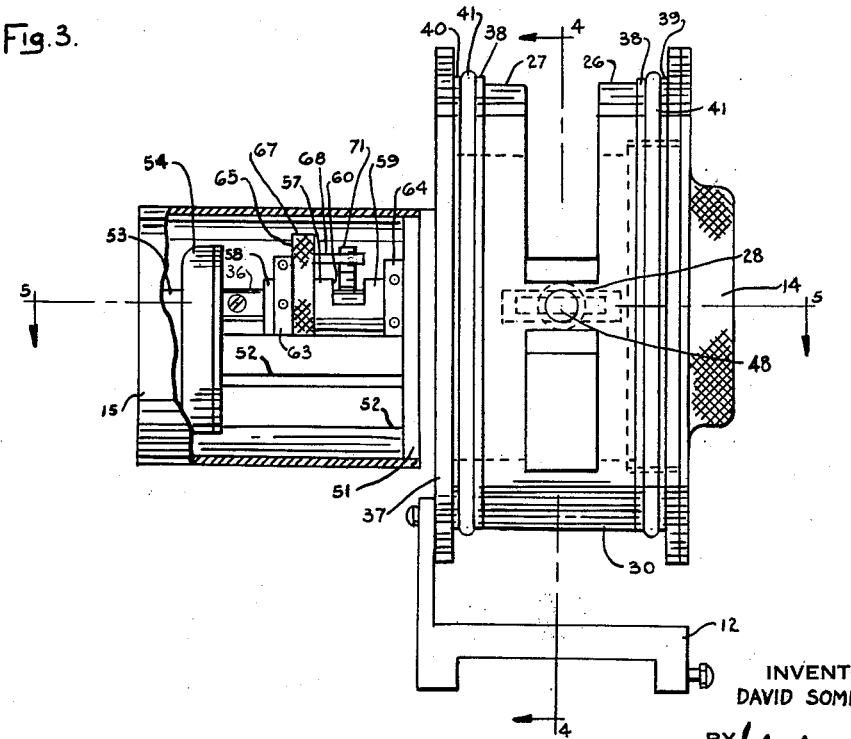
FIG. 3 is an interior view of the other side of the present camera with the front housing removed from the camera instrument proper, and part of the rear housing broken away to show the motor and associated components governing or controlling oscillation and rotation of the specimens or crystalline samples.

FIG. 5 is a section taken along the lines 5—5 of FIG. 3 to illustrate in detail the construction and arrangement and inter-relation of parts, especially in respect of (a) the oscillation and rotation governors, (b) the removable beam stop or trap, (c) means for providing a controlled atmosphere within the camera interior, and (d) means for charging the camera interior with a gas and for evacuation of the same;

FIG. 6 is an ink representation of an actual powder diffraction pattern photograph obtained with and taken by the improved diffraction camera of FIGS. 1–5;

FIGS. 7 and 8 are separate detail front views of the two beam angle measuring interfitting plates controlling the degree of oscillation of the specimen or of the shaft on which the specimen sample is or may be mounted; and FIG. 9 is another sub-assembly view or detail drawing, of the main spacer which controls oscillation and rotation (in both directions) of the specimen carrying central shaft.

According to that embodiment of the invention which is shown herewith in the accompanying drawings, the present improvements in X-ray powder diffraction cameras may comprise a cylindrical film holder and camera 10 enclosed in a front housing 11. The housing 11 may be made of aluminum or any other suitable material, preferably metallic in nature, and is mounted on a stand 12 and provided with a side opening 13 for passage of the X-rays (not shown) into the interior of the camera 10.

To load the film in the camera 10 a relatively large access plate 14 is constructed and arranged to be screwed on the front of the major housing 11. Both the main housing 11 and the access plate 14 may be made of any suitable material, as for example aluminum, steel or other metal; and the mounting stand or bracket 12 also may be made of the same material or of different composition if desired.

Appendent to the rear of the camera 10 a rear housing 15 may be disposed to cover an assembly or sub-assembly of parts for controlling oscillation and rotation of the crystalline specimen to be mounted centrally of the front housing 11.

To complete the outer shell assembly a steel strap or band 16, which also may be of aluminum or other similar material, is cut or otherwise formed so that it may be fitted on around the outside periphery of the camera 10: the band 16 being removed entirely from the assembly to load the camera 10 with the sensitized photographic film and then put back on in place over the unexposed film. A stud and nut fastener 17 provides convenient means for bringing together the opposed ends of the outer band 16 in a tight fit or seal.

FIG. 2 gives an end view of the outer band 16 per se, and removed from association with the camera 10. As there seen, the band 16 preferably comprises a metallic strip or band 18 of aluminum or other suitable material cut and shaped to size such as to fit around, girdle-like, the outer periphery of the main camera housing 11. An under-cushion or rubber pad 19 may be used to cover the underside or undersurface of the aluminum apron or strap 16 thus rendering or enabling a better fit and seal than would be obtained without the under-cushion 19. Clips 20, 21 are welded or otherwise affixed to the opposed ends of the band or outer strap 16, the clip 20 being provided with a projecting hook 22 and the clip 21 having a slotted holder or keeper 23 in alignment with the hook member 22. A connecting pivoted stud 24 is held at one of its ends by the hook 22, and its other end is threaded to receive a tightening nut 25. With this arrangement of parts, as will be understood, it is a relatively simple matter to place and replace the outer band 16 around the circumference or outer peripheral surface of the principal camera housing 11. That done, a sealing interengagement between the band 16 and the major housing 11 is effected by dropping the threaded free end of the stud 24 in the slotted portion of the clip 21 and then tightening up on the nut 25. It is also evident that any other suitable fastening means, other than the coacting hooked member 22 and the stud 24, may be utilized to fasten down the outer apron or band 16 after it has been placed on the main housing 11 of the diffraction camera 10.

Referring now particularly to FIGS. 3–5, it will be seen that the front housing skeleton or frame 11 (without the encircling outer band 16) may comprise two spaced front and back bands 26, 27 both of relatively thick and sturdy cross section, connected together in fixed spaced relation by two side cross pieces or connectors 28, 29 and one bottom cross bar 30.

An X-ray collimator holder 31 of conventional design and manufacture is mounted on one side of the frame 11 in fixed registration with a central opening 32 of the cross piece 29. The opening 32 is also in alignment with the corresponding aperture 13 in the housing 11 when the outer band 16 is placed in position around the circumference of the cylindrical camera 10.

A substantially similar mounting arrangement on the opposite side of the camera housing 11 comprises a beam stop 33, which is preferably cone shaped and elongated, fixed in registration with a steel bushing 34 having a central hole 47 drilled therethrough and capped with a lead shield 35 centrally of the connector or other medial cross bar 28. The shield 35 also has a central aperture, in registration with the drilled hole 47 in the bushing 34, but this aperture extends only partially through the thickness of the lead shield 35.

The specimen itself is preferably mounted in or upon the exposed end of a central spindle or shaft 36 which is adapted to be oscillated and rotated and which projects forwardly from the rear cover plate 37 of the camera 10. As will be noted from FIGS. 4 and 5, the specimen mounting shaft 36 is constructed and arranged so as to be disposed and located in a position at about the center of the back plate 37 and is interposed between the beam stop 33 and the collimator holder 31. With a collimator of any desired conventional size and shape (not shown) inserted in the collimator holder 31, the X-ray beams entering the interior of the camera housing 11 by way of the collimator hit the specimen carried on the end of the mounting spindle or shaft 36. Some of these X-ray beams will thereupon be diffracted from the specimen body and therefore contact the sensitized photographic film previously installed or loaded in the camera 10 under the outer band 16. The undiffracted X-rays will travel through the specimen at the end of the shaft 36 to the X-ray beam stop 33 on the far side of the mounting spindle 36.

Stated otherwise, the collimator holder 31 and the beam stop 33 on opposed sides of the camera 10 and the specimen spindle 36 interposed therebetween all lie in substantially the same horizontal plane; the collimator and its holder 31 and the X-ray beam stop 33 are all on substantially the same longitudinal axis; and the longer or major axis of the mounting shaft 36 is perpendicular to the longer axes of the collimator, its holder 31 and the beam stop 33.

To provide means for inserting the specimen inside the camera housing 11 and adjusting its position on the shaft 36 outside of the dark room and under daylight or artificial lighting conditions, an inner band of ordinary black or dark masking paper (not shown) may be adhesively fastened or otherwise secured to the undersides of the heavy frame front and back bands 26, 27 which define the cylindrical nature and structural shape of the camera 10 and its front housing 11.

Means for effectively sealing off the interior of the front housing 11 after the photographic film is loaded in position in the dark room around the outer peripheries or surfaces of the large frame bands 26, 27, may comprise guide means in the nature of a slight elevation or boss 38 running around the entire circumference of each band 26 and 27, and spaced just a short distance horizontally from the shoulders 39, 40 of the bands 26, 27 respectively. This arrangement is such as to constitute a relatively narrow passageway or track 41 on each side of the camera 10 underneath the outer band 16 and around the entire outer peripheral area of each of the structural bands 26, 27. The present invention contemplates that each of these narrow passages 41 is to be filled up with a rubber or rubberized "O-ring" sealing unit. Thus the interior of the camera 10 is completely sealed off against admission to or emission from the inside of the cylindrical camera 10, at least through or around the outer band 16 which completely encircles the two inner frame bands 26, 27. The O-rings, inserted in each of the two side passageways 41 seal off the side edges of the outer band 16 where they meet and contact the shoulders 39, 40 of the inner bands 26, 27. The end portions of the outer band 16 are brought into face to face engagement and contact with each other as seen in FIG. 2 by tightening up on the adjusting screw or nut 25. Thus the joint or meeting place of the two extreme ends of the outer band 16 is also effectively sealed off.

It should be noted in addition that not only do the bosses 38 define one side of the O-ring tracks or passageways 41 on each side of the camera 10, but they may also be utilized as stop means for preventing accidental dislodgement, that is, lateral movement of the film after it has been loaded into the camera front housing 11 under the outer band 16. That is to say, the width of the standard size film 1⅞" wide by 16" long being predetermined and a known factor, the bosses 38 may be so positioned that the photographic film when in place will have its marginal edges just barely touching the outer edges of the bosses 38; so that after being so placed the outer edges of the bosses 38 will control, restrict and prevent the film from moving or shifting sideways while inside the camera housing 11.

To seal off the front of the camera 10 after the specimen has been mounted on the spindle or central mounting shaft 36, it is here proposed and contemplated that the front access plate 14 to be threaded for screw-tight engagement with a similarly threaded outer edge portion of the inside periphery of the frame band 27. As an additional front sealing means the free side 42 of the band 26 may be grooved out as at 43 for the insertion and accommodation of another O-ring seal 44. Thus the joint where the front access plate 14 meets the front housing 11 in the forepart of the camera 10 is also sealed off against the admission or emission of any undesired atmosphere or gas.

It will be appreciated too that the front door or access plate 14 constitutes an easy to remove full diameter cover for closing off the interior of the camera 10 and the front housing 11 from view. With the face plate 14 removed, a full view of the inside, including the specimen mounted therein on the shaft 36 is afforded, even with the camera 10 in operation and the X-rays turned on. When in place, the solid aluminum or other metal access plate 14 gives full and sufficient protection to the X-ray technician or operator against X-ray scatter. Also such darkened area tends to reduce exposure time and makes for better film registration.

To establish and maintain a light-free controlled atmosphere within the housing 11 of the cylindrical camera 10 inlet and outlet ports 45, 46 whereby gases may enter or exit are made integral or constructed and arranged to communicate with the rear plate 37. This control of the atmosphere within the interior of the camera 10 may be set up and maintained as long as necessary or desirable, while the camera is in operation. Obviously the desired atmosphere may be introduced into the camera 10 and removed therefrom at any time and independently of the conditions under which the film is loaded into the camera 10.

Moreover the beam stop 33 and the collimator (not shown) manifestly are easily removed and replaced; and different sizes and shapes of each may be substituted in the camera assembly as desired or required.

Furthermore the narrow bore hole or slot 47 which runs through the entire length of the steel bushing 34 serves to permit the lead shield 35 to function as a built in permanent zero point marker 48 in the beam stop 33; that is, the exact point on that side of the camera 10 which lies opposite the collimator and its holder 31 and to which the undiffracted X-ray beams will penetrate after passing through the crystalline specimen carried by the mounting shaft 36. Because of the position of the hole 47 extending through the steel bushing 34 and its communication or registration with the partially perforated lead shield 35, the zero point marker 48 is reproduced on the developed photographic film 49 as a pin point or very narrow dash line 50 denoting the zero angle of diffraction or point at which no diffraction of the X-ray beams occurs or is discernible. That is to say: some of the X-ray scatter will enter the beam trap 33, pass through the bored hole 47 in the steel bushing 34 and eventually, that is, after sufficient exposure, also penetrates through the relatively thin unbored portion of the lead shield 35 to reach and mark the zero point on the photographic film which of course is immediately in back of and resting upon or against the lead shield 35.

Means for governing and controlling oscillation and rotation of the specimen carrying shaft 36 are conveniently disposed in the rear portion of the present camera 10 in a unit or sub-assembly protected by a rear housing or cover and comprising a motor, a driving connection between the motor shaft and the specimen spindle and a spacer superstructure or sleeve carried by the specimen shaft and constructed and arranged to coact (as will be explained) with the motor and the specimen shaft to effect bodily oscillation and rotation of said shaft as desired.

As more particularly noted in FIGS. 3, 5, and 7 to 9 the embodiments of the invention contemplate the rear housing or cover 15 of suitable size and shape such as to be adapted to be slipped on over the projecting back portion of the camera 10 and preferably made of aluminum or other metallic composition material. Moreover the aluminum cover or rear cap 15 should be interiorly threaded around its bottom edge to threadedly engage with the corresponding threads fo a circular thick back mounting plate 51 from which three spaced support bars 52 project rearwardly and away from both the plate 51 and the front housing 11 of the camera 10. The supporting bars 52 constitute a satisfactory bracket for mounting and holding the motor 53 actuating oscillation and rotation of the specimen and specimen mounting shaft 36 in substantially or generally the same horizontal plane as that of the back mounting plate 51, the three bar brackets 52 and their other associated parts and components. The supports 52 may be welded, braised or otherwise affixed at one end to the free face or exposed surface of the mounting block 51, and attached at their other end as for example by lugs or screws to the motor 53 or to a gear box 54.

The motor 53 is preferably a relatively small synchronous motor of the type made in the U.S.A. by the Cramer Controls Corporation of Centerbrook, Conn. under U.S. Patent No. 2,436,231, type No. 117, r.p.m. 4, v. 115, A.C. cy. 60, w. 2.7. Motor 53 is of course also equipped with a rotatable and reversible and oscillatable driving shaft (not shown) positioned within a gear box 54 and adapted by suitable conventional gearing located within the gear box 54 to provide means in the nature of a chuck or an adaptor 53a for driving a 4130 steel specimen holder shaft 36. Manifestly the shaft 36 may be made of other material but is preferably steel. It will be understood too that the specimen itself (not shown) may be inserted for example in the slotted specimen holding station 55 at the forward end of the shaft 36 within the interior of the front housing 11 of the camera assembly 10, and that as the shaft 36 is rotated or oscillated from its rear end by the motor driving shaft inside the gear box 54, the X-rays will be correspondingly diffracted from the specimen to establish a diagram or pattern on the sensitized film such as the several line delineations 56 schematically referred to or generally indicated in FIG. 6 of the drawings hereof. It is to be understood of course that the specimen may be mounted by different means, such as putty, beeswax, magnetic chuck or holder, or any other suitable and desired means.

As seen in FIG. 9 the spacer sleeve or superstructure 57 which effectively controls and governs oscillation and rotation of the driven specimen mounting shaft 36 is carried thereby: that is by the shaft 36, and comprises an elongated cylindrical hollow sleeve body fitting 57 made preferably of brass or of other nonmagnetic material. The main sleeve spacer or fitting 57 is also provided with a threaded reduced or constricted neck or end portion 58, and a wider unthreaded medial portion 59 with a half circumferential cut out 60. The main sleeve spacer 57 also comprises a partially threaded rear portion 61 of wider diameter than either the medial portion 59 or end 58, although all of these three portions 58, 59 and 61 of successively larger diameter are made integral and as a single unitary component to wit the sleeve or main spacer 57. The largest portion 61 of the spacer 57 is also equipped with a relatively narrow flange or collar 62. Thus (as seen in FIG. 9) the spacer 57 is constructed with three offsets or shoulders separating its four components of increasing diameter, namely, the reduced end or fore portion 58, the slotted middle 59, the larger back 61, and the wider collar 62.

The collar 62 of spacer 57 serves as an anchoring flange or stop to prevent longitudinal or bodily movement endwise in the horizontal plane of the specimen shaft 36 (see FIG. 5).

The two threaded portions of the main spacer sleeve 57, that is the neck or fore part 58 and the back portion 61 of larger diameter, each carry and threadedly engage brass adjusting nuts 63 and 64. The rear brass nut 63 acts to lock into a fixed position the thick circular back plate or mounting block 51 in back-to-back relation to the rear camera plate 37. The front brass fitting or nut 64 locks into fixed position a two part interacting dial sub-assembly for regulating the degree of specimen oscillation, the arrangement being such as to fix and maintain the position of this oscillation sub-assembly regulator against the first main spacer 57 offset or shoulder, that is, the offset separating the two front and middle portions 58 and 59 thereof.

The oscillation regulator dial assembly sets and visually indicates the degree of angular oscillation of the specimen carrying shaft 36, and its construction and operation may be explained as follows:

Looking at the camera 10 from the rear, and with the back cover or housing 15 removed so as to expose to view the motor 53 and its associated elements, one sees that the face of the front steel plate or dial 65, which is smaller than the other and larger dial, is marked off or scribed with generally vertical reading lines (see FIG. 8) to visually denote the following angles, both to the left and right of center, viz., 10, 20, 30, 45, 60 and 90, the center line being scribed 0. The front dial 65 is also provided with a centrally disposed aperture whereby it is slipped on over the shaft 36 to rest against an intermediate steel washer or small spacer 66 similarly carried by the spindle 36 and in contact with the other or rear dial plate 67, also with a central cut out for mounting on the shaft 36, and also scribed with an O center line and angle lines to the left and right of the zero line at the same angles as those scribed on the first dial 65 (see FIG. 7).

One small pin 68 projects from the rear of the front dial 65 through an extended slot or cut out curved segment 69 along the upper face of the back dial 67. Another pin 70 similar to the pin 68 projecting from the back of the front dial 65 is disposed at the rear surface of the back dial plate 67. The relative position of these two pins 68, 70 defines and fixes the angle of specimen oscillation. The extent or degree of the shaft 36 oscillation angle is determined by setting the scribe marks on the front and rear dials 65, 67 to whatever angle is desired. To that end, as will be understood, a hole is bored only partially through the diameter of the shaft 36 about midway of its length and in line with the slotted segment of the main sleeve or spacer 57, and a threaded regulator dog or rod 71 is screwed into the spacer hole.

As seen in FIGS. 3 and 5, the regulator dog or rod 71 acts as a stop to restrict and limit the oscillatory movement of the specimen shaft 36 when such movement is actuated by the motor 53. That is to say, when the oscillating shaft 36 carries the upstanding regulator rod 71 to the pin 68 extending back from the front dial plate 65 and out through the slotted segment 69 of the rear dial plate 67, the moving dog 71 carried by the turning shaft 36 comes to rest when it hits the pin 68. Of course, rotation or oscillation of the shaft 36 stops simultaneously when the rod regulator 71 comes to rest against the side of the pin 68.

The synchronous motor 53 is of such construction and specification that it will reverse the direction of rotation of the driven shaft 36 when rotation thereof ceases, even for a very short interval. Then the shaft 36 will rotate as stated, in the direction opposite to that of its prior rotation until the regulator screw 71 hits the other pin 70 projecting from the rear of the larger dial plate 67. At that time the direction of rotation of the spindle 36 automatically will be reversed once more by the reversing nature or action of the motor 53. The oscillation thus described continues indefinitely as long as the motor is running and as long as the regulator dog 71 continues periodically to make back and forth sweeps in successive or alternating contact with the two projecting stop pins 68 and 70.

However, if and when the regulator dog 71 is unscrewed and removed entirely from engagement with the driven spindle 36, when the specimen and the shaft 36 which carries the specimen will therefore and thereupon be free to rotate continuously in one direction only, that is, for 360 degrees and without any oscillation. To make the shaft 36 rotate continuously and indefinitely in the opposite direction only, and again without any oscillation, it is only necessary to push the switch of the motor 53 and then re-start it. Thereupon the desired change of direction of rotation of the specimen carrying shaft 36 is automatically effected.

To seal off the rear housing sub-assembly, the back cover or cap 15 is preferably provided with an annular depression or groove running around its outer edge or rim and another O-ring seal 72 (the fourth such O-ring referred to herein) is seated therein. The insulated electric cord wires 73 which conduct the requisite electricity current to the motor 53 may be run from the motor 53 underneath or inside the back cap or housing 15 through a very small opening in the thick back plate 51 just barely large enough to provide passage for the wires 73 to any available current source. To make an extra tight seal at that point, this hole may be plugged (with the wires 73 passing through it) with putty, melted wax or any other heat or cold hardenable packing composition or material.

In the light of the foregoing the following is claimed:

1. The combination in a cylindrical X-ray diffraction camera having an oscillatable and rotatable specimen carrying spindle, of means for controlling the oscillation and rotation of said spindle comprising a motor, a rotatable and oscillatable driving shaft driven from the motor, an adaptor connecting the driving shaft to the specimen carrying spindle, a spacer sleeve carried by the spindle, stop means mounted on the spacer sleeve for governing the degree of oscillation of said spindle, and pin means projecting from the spindle and adapted to contact the stop means on the spacer sleeve thereby effecting oscillation of the spindle.

2. The combination of claim 1 further characterized in that the relative position of the stop means with respect to said pin means is adjustable to correspondingly vary the degree of oscillation.

3. The combination of claim 1 further characterized in that means are provided for removing said pin means thereby substituting continuous rotation of said spindle in place of oscillation.

4. The combination of claim 2 further characterized in that said stop means on the spacer sleeve are maintained out of contact with the removable pin means on said spindle.

5. The combination of claim 4 further characterized in that the means for controlling oscillation and rotation of the spindle comprises sealed in operating units.

6. The combination in an X-ray diffraction camera assembly having a variable oscillation rotatable specimen mounting shaft, of means for predetermining and fixing the angular degree of oscillation of said shaft comprising a removable dog projecting vertically upward from the oscillatable and rotatable shaft, a fixed sleeve surrounding said shaft on both sides of the dog, complementary oscillation angle determining front and back plates carried by the sleeve forwardly of the dog, a pin projecting horizontally from the front plate through the back plate and in front of the path of travel of the projecting dog carried by the shaft, another pin projecting from the back plate horizontally in the rear of the path of travel of said dog, the relative arrangement of both pins to said dog and to each other being such as to provide variable fixed stops to control the angular degree of oscillation of said specimen mounting shaft.

References Cited in the file of this patent

UNITED STATES PATENTS

| | | |
|---|---|---|
| 2,259,228 | Rankin | Oct. 14, 1941 |
| 2,341,108 | McLachlan | Feb. 8, 1944 |
| 2,584,962 | Gross | Feb. 5, 1952 |
| 2,968,990 | Buck et al. | Jan. 24, 1961 |